G. KAWASAKI.
BREAD CUTTER.
APPLICATION FILED DEC. 7, 1908.
937,611.
Patented Oct. 19, 1909.
3 SHEETS—SHEET 2.
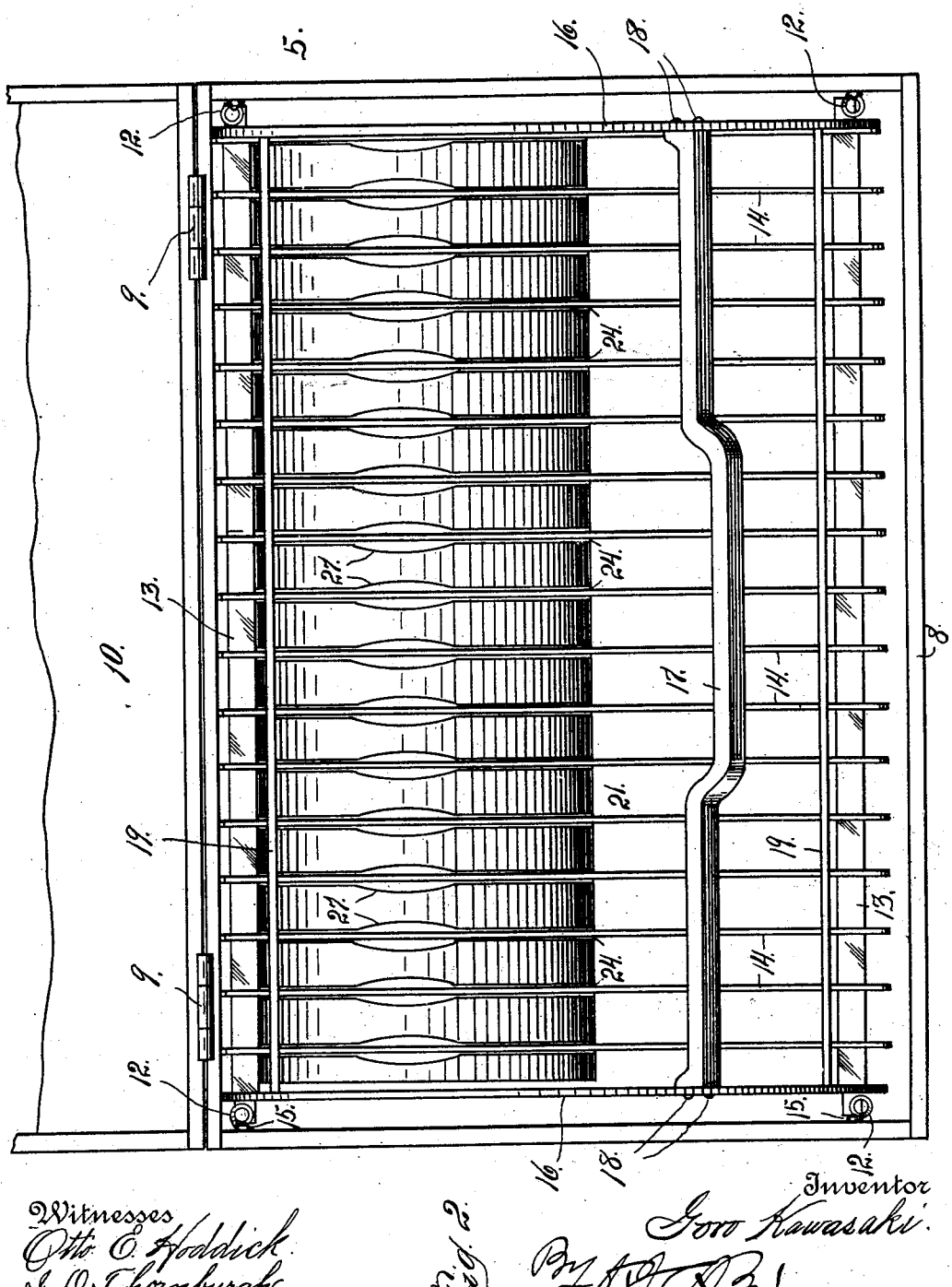

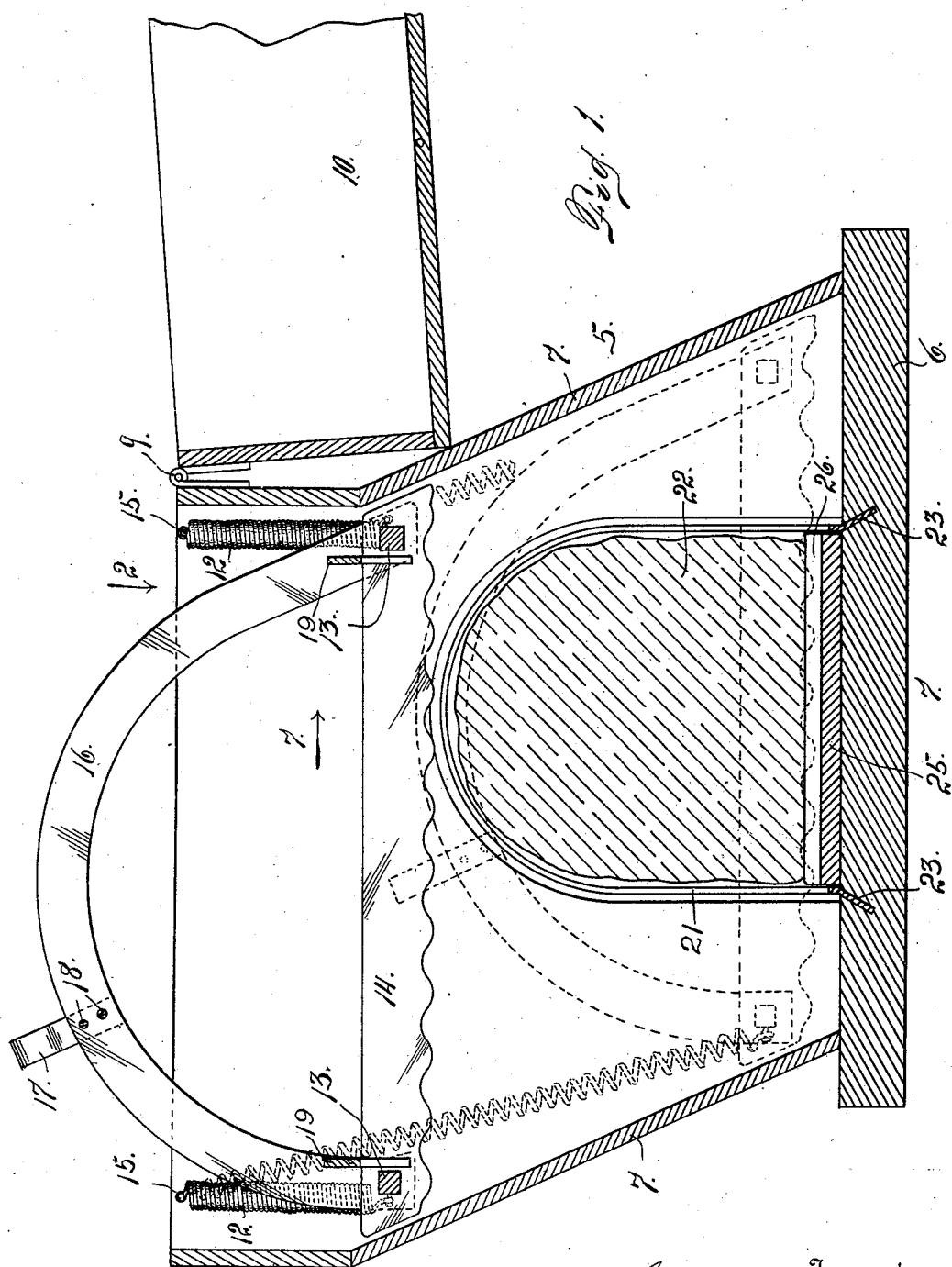

G. KAWASAKI.
BREAD CUTTER.
APPLICATION FILED DEC. 7, 1908.
937,611.
Patented Oct. 19, 1909.
3 SHEETS—SHEET 3.
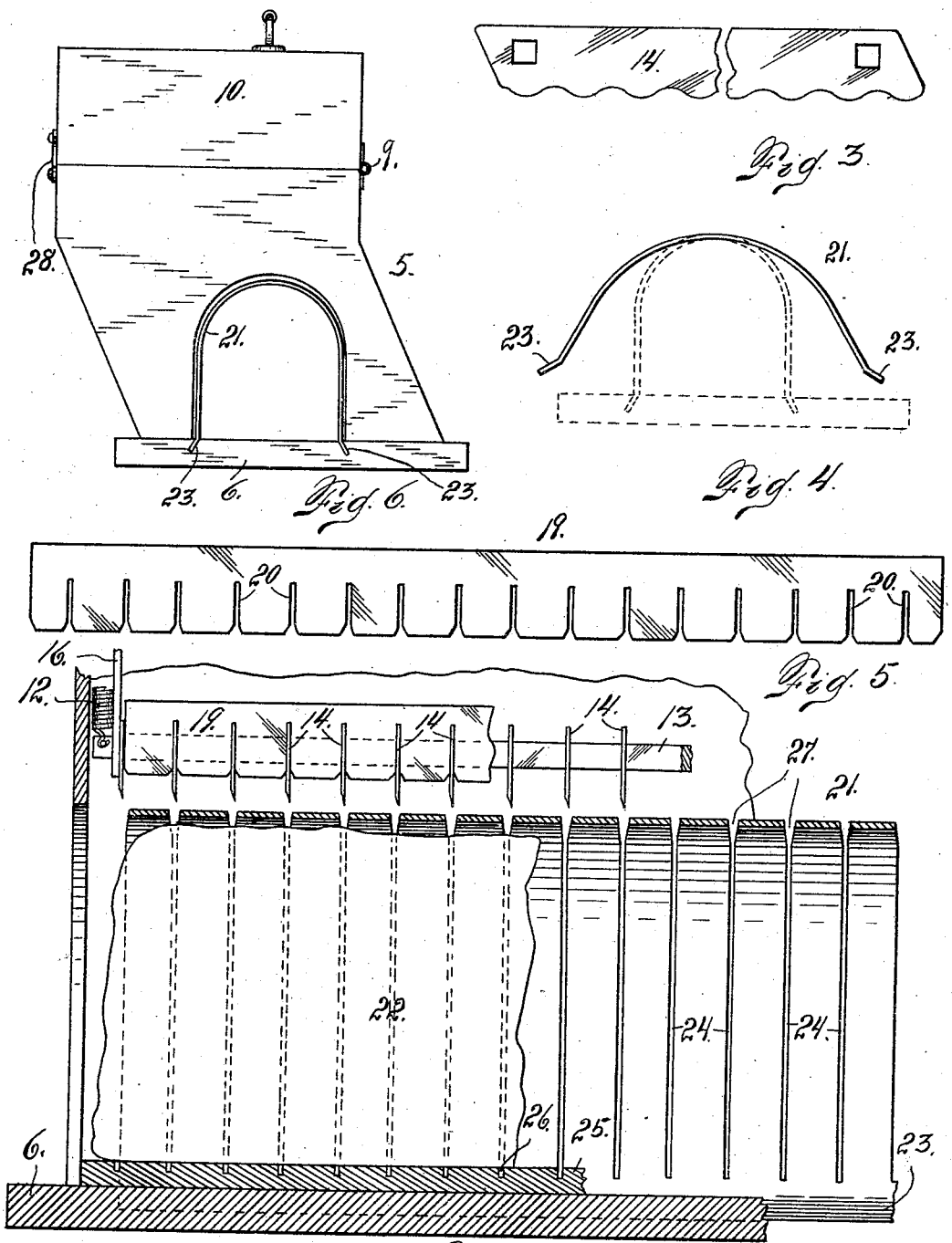

UNITED STATES PATENT OFFICE.

GORO KAWASAKI, OF DENVER, COLORADO.

BREAD-CUTTER.

937,611.

Specification of Letters Patent.　　Patented Oct. 19, 1909.

Application filed December 7, 1908.　Serial No. 466,308.

*To all whom it may concern:*

Be it known that I, GORO KAWASAKI, citizen of Japan, residing in the city and county of Denver and State of Colorado, have invented certain new and useful Improvements in Bread-Cutters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in bread cutters, my object being to provide a device of this class adapted to cut an entire loaf of bread into slices of any desired thickness, by a single downward stroke of the knife carrying frame. This frame is spring supported, so that after each downward stroke the knife carrying frame is automatically returned to its upward position. The casing is so shaped that the knives move downwardly in a direction inclined to the vertical, whereby they act upon the bread more advantageously than if the direction of the movement were absolutely vertical, since the blades while passing through the bread have a sort of shearing action, as they move simultaneously both horizontally and vertically.

The series of knives, with which my improved cutter is equipped, is slidably mounted upon bars which the blades are apertured to receive. By virutue of this arrangement the knives may be so adjusted as to cut the bread into slices of any desired thickness. The knives when properly adjusted are held in such position by slotted gage plates, applied to their opposite extremities adjacent to the bars upon which they are mounted. The various knives enter the slots of the gage plates, whereby the knives are properly spaced, as heretofore stated. A number of sets of gage plates, each set having spacing slots arranged at different distances, should accompany each device so that the thickness of the slices of bread may be varied as desired.

The device is further equipped with a slotted cover or housing in which the loaf of bread is inclosed during the cutting operation, the slots in the housing being arranged to coincide with the position of the various bread cutting blades. This slotted housing fits the loaf of bread quite closely, whereby the latter is supported and prevented from changing its shape during the bread cutting act.

Having briefly outlined my improved construction, I will proceed to describe the same in detail, reference being made to the accompanying drawing in which is illustrated an embodiment thereof.

In this drawing, Figure 1 is a vertical section taken through my bread cutter. Fig. 2 is a top plan view of the same, or a view looking in the direction of arrow 2 Fig. 1. Fig. 3 is a detail view of one of the knives or blades, the same being broken away between its extremities. Fig. 4 is an end view in detail of the slotted housing. In this view the said housing is shown in two positions, one being in full lines, and the other in dotted lines. In the full line position the housing is shown with its edges detached from the base of the casing, the spring tension or elasticity of the housing being sufficient to cause its edges to spring away from each other; while the dotted lines indicate the normal position of the housing when in use. This view is on a smaller scale than Figs. 1 and 2. Fig. 5 is a detail view of one of the slotted gage plates. Fig. 6 is an end view of the bread cutter shown on a smaller scale than in Figs. 1 and 2, the hinged upper portion of the casing being closed. Fig. 7 is a vertical longitudinal section taken on the dotted line 7—7 Fig. 1 and partly broken away.

The same reference characters indicate the same parts in all the views.

Let the numeral 5 indicate a casing provided with a base 6 having parallel walls 7, inclined at a suitable angle, the said walls being introduced between the base and a vertical top portion 8 of the casing, to which is hinged, as shown at 9, a cover 10.

Suspended from the top portion of the casing by means of spiral springs 12 is a knife-carrying frame provided with parallel longitudinally disposed bars 13, upon which is slidably mounted a number or series of bread cutting knives 14, the extremities of the knives being apertured to receive the bars, the latter being polygonal, preferably square, in cross section. There are four springs 12, one being located at each corner of the casing (see Fig. 2). The upper extremities of these springs are connected with the upper part of the casing, as shown at 15, while their lower extremities are connected with the knife holding bars 13. The bars 13 are connected by two bow-shaped members 16, each of the said members being connected with the bars at one end of the casing, the said members being upwardly bowed from the bars, whereby they project out of the casing when the cover is open. The upper portion of these bars is connected by a longitudinally disposed bar 17 forming a sort of handle for manipulating the blade-carrying frame, the extremities of the handle bar being connected with the bow-shaped members by suitable fastening devices 18.

To the opposite extremities of all of the blades 14, gage plates 19 are applied, the said plates having slots 20 formed upwardly from their lower edges, to receive the knife blades to which they are applied from above. These slots are spaced according to the thickness of the slices to be cut when the device is in use. When applied to the blades the latter are, of course, spaced to correspond with the distance between the slots. These gage plates also strengthen the blades, which are preferably formed comparatively thin, their cutting edges being shaped to facilitate the performance of the cutting function. It is preferred that each device shall be equipped with several extra sets of gage plates having slots 20 located at different distances apart, so that the bread may be cut in slices of different thickness, as circumstances may require.

In the lower part of the casing, or that having inclined parallel side walls 7, is located a housing 21 having the general shape of a loaf of bread 22, the lower edges 23 of the housing being inserted in slots or grooves formed in the base 6 of the casing. This housing is provided with a series of slots 24 which extend downwardly to approximately the upper surface of the base 6 of the casing. Slidably mounted upon the base 6, and within the slotted housing, is a board or plate 25, having slots 26 in its upper surface adapted to receive the cutting edges of the knives which, as shown in the drawing, have a wave-like shape, to facilitate the performance of the cutting function, as heretofore explained.

When a loaf of bread is to be cut by the use of my improved device, the plate 25 is removed from the housing and the loaf placed thereon, after which the loaf is inserted in the housing by sliding a plate to its position. During this time it will be understood that the knife-carrying frame is at its upper position where it is yieldingly supported by the spiral springs 12.

It is assumed that the loaf of bread is approximately of the same length as the slotted housing, and that it will be cut into as many slices as the device has blades. This, however, is not necessary, since a relatively short loaf or even a part of a loaf may evidently be cut by the use of my improved device if desired.

From what has already been stated it will be understood that after the loaf is in place, it is only necessary for the user to grasp the handle 17 and press downwardly thereon, whereby the knife-carrying frame is caused to descend and the blades to pass through the loaf which is formed into slices of the desired thickness. By virtue of the slots 26 formed in the upper surface of the plate 25 upon which the loaf rests, the cutting edges of the knives are caused to pass completely through the loaf.

It is also to be understood from the preceding explanation, that the blades when acting upon the loaf are moving downwardly in a direction inclined to the vertical, thus facilitating the performance of the bread cutting or slicing function. As soon as the loaf of bread has been cut in the manner aforesaid, the user ceases to press downwardly upon the handle 17 and allows the knife-carrying frame to move upwardly in response to the recoil of the springs 12. After the loaf of bread has been cut into slices and the knife blades have been returned to their upper position, as has just been explained, the sliced bread may be removed from the slotted housing by sliding the plate 25 out of the housing endwise, one end of the casing being open for the purpose (see Fig. 6).

From what has already been explained it will be understood that when the gage 19, which is applied to the blades for holding them in proper relation for cutting the bread into slices of predetermined thickness, are changed in order to cut slices of a different thickness, it will also be necessary to remove the slotted housing and introduce another housing in harmony with the gage plates, and the new arrangement of the knives, since the slots in the loaf housing must of course coincide as to position with the arrangement of the bread cutting blades. Under the same circumstances, the plate 25 must be changed for another having slots properly spaced.

To facilitate the entrance of the knives into the slots 24 of the housing, the upper extremities of these slots are slightly enlarged, giving them a V-shaped appearance, as shown at 27. By virtue of this construction, the blades may vary slightly from accurate alinement with the slots 24 and still enter the slots, as will be readily understood.

When the device is not in use the cover 10 may be thrown to the closed position, as shown in Fig. 6, whereby the mechanism within the casing is protected from injury and also from the entrance of dust and dirt.

As shown in Fig. 6 the lid or cover 10 is connected with the body of the casing by a suitable fastening device 28.

The slotted housing 21 is preferably formed from a plate of spring metal which is normally adapted to assume the position indicated by full lines in Fig. 4, whereby its lower edges are so separated that when the housing is compressed on opposite sides to bring it to the dotted line position in Fig. 4, or to the position shown in full lines in Fig. 6, it will be under such tension that when its lower edges 23 are inserted in the slots in the base of the casing, these edges will have a tendency to spring outwardly, thereby holding the housing securely in the casing. This tendency may be overcome by pressing upon opposite sides of the housing, in which event it may be easily removed from the slots which its lower edges engage.

Having thus described my invention, what I claim is:

1. A bread cutter comprising a casing, a knife-carrying frame mounted therein, springs for supporting the frame in the upper portion of the casing, said frame having separated bars, knives having their extremities apertured to fit said bars, the knives being loose on the bars, and a slotted gage-plate, adapted to receive the upper edges of said knives.

2. A bread cutter comprising a casing, a spring-supported, knife-carrying frame mounted in the casing, said frame having separated bars, knives having their extremities apertured to fit the bars, being free to slide thereon, and a gage-plate slotted to loosely engage said knives, the upper edges of the blades entering the said slots.

3. A bread cutter comprising a casing, a spring-supported, knife-carrying frame, spiral springs for supporting the frame in the upper portion of the casing, the frame having parallel separated bars polygonal in cross section, knives having their extremities apertured to fit said bars, and a slotted gage-plate adapted to loosely engage the upper edges of a series of knives, whereby the latter are spaced for the purpose set forth.

4. A bread cutter comprising a casing, a frame mounted in the casing, spiral springs for supporting the frame in the upper portion of the casing, the said frame having separated bars, knives having their extremities apertured to fit the bars, and two slotted plates adapted to respectively engage the opposite extremities of the series of knives, substantially as described.

5. A bread cutter comprising a casing, a spring-supported frame mounted therein, the said frame having parallel, separated bars, knives having their extremities apertured to fit said bars, gage-plates slotted to receive the upper edges of all of the knives, and a slotted housing located in the casing and occupying a position below the knives, when the latter are at their upward limit of movement.

6. A bread cutter comprising a casing, a knife-carrying frame mounted therein, spiral springs for supporting the frame in the upper portion of the casing, the said frame having parallel, longitudinally disposed separated bars polygonal in cross section, knives having their extremities apertured to fit said bars to vary the space between the knives, slotted gage plates adapted to receive the upper edges of the knives, and a slotted housing located in the casing and occupying a position below the knives when the latter are at their upward limit of movement, the slots of the housing coinciding as to position with the knives, the housing being shaped to conform to the general shape of a loaf of bread, which the housing is adapted to receive, substantially as described.

In testimony whereof I affix my signature in presence of two witnesses.

GORO KAWASAKI.

Witnesses:
 A. J. O'BRIEN,
 A. EBERT O'BRIEN.